United States Patent [19]

Sharp

[11] 3,951,447
[45] Apr. 20, 1976

[54] TRAILER TOP WITH LIFTING AND MOUNTING MEANS

[76] Inventor: Maurice C. Sharp, P.O. Box 2A, Rossville, Ind. 46065

[22] Filed: Sept. 6, 1974

[21] Appl. No.: 503,612

[52] U.S. Cl. .............................. 296/137 B; 52/588; 105/377; 296/100
[51] Int. Cl.² .............................................. B60J 7/10
[58] Field of Search ................ 296/137 B, 100, 101; 105/377, 276, 277; 52/588, 529

[56] References Cited
UNITED STATES PATENTS

| | | | |
|---|---|---|---|
| 1,322,310 | 11/1919 | Kring | 105/377 |
| 2,985,118 | 5/1961 | Maharick et al. | 296/100 X |
| 3,330,225 | 7/1967 | Barry | 296/100 X |
| 3,450,431 | 6/1969 | Tyler | 296/100 |
| 3,508,787 | 4/1970 | Strong et al. | 296/100 |

Primary Examiner—Robert J. Spar
Assistant Examiner—Donald W. Underwood
Attorney, Agent, or Firm—Woodard, Weikart, Emhardt & Naughton

[57] ABSTRACT

A rigid cover mountable to the top of a trailer vehicle with means provided for the lifting of the cover from the vehicle and means provided for securing the cover to the vehicle. The cover includes a plurality of interconnected rigid panels which rest atop the peripherally extending upper edge portion of the trailer vehicle. Interlocking channels are fixedly secured to the adjacent ends of the panels extending across the vehicle preventing rain water from entering the enclosure formed by the panels. A plurality of brackets are hingedly mounted to the panels with each bracket having a cable fixedly mounted thereto. The cables allow for the lifting of the panels when the brackets are swung to their upward position whereas the cables secure the panels to the vehicle when the brackets are swung to their downward position. A plurality of pins are fixedly mounted to the brackets and extend into the sidewalls of the vehicle when the brackets are in the downward position preventing relative motion between the panels and vehicle. Fasteners are provided for locking the brackets in the downward position.

8 Claims, 4 Drawing Figures

TRAILER TOP WITH LIFTING AND MOUNTING MEANS

BACKGROUND OF THE INVENTION

1. Field of the Invention: This invention is in the field of interlocking structures for enclosing the top of a trailer vehicle.

2. Description of the Prior Art: Numerous types of tarpaulin or canvas covers are known in the prior art for attaching to and covering the upper open end of trailer vehicle bodies. Such a prior art device is disclosed in U.S. Pat. No. 3,511,408 issued to E. Hughes. Canvas covers provide many disadvantages. A main disadvantage is the installation and removal of the canvas cover. Generally, two men are required to remove a canvas cover or to install the canvas cover on the vehicle. During winter, the ropes used to secure the canvas cover become frozen requiring ice removal from the ropes as well as the canvas cover. Canvas covers are quite susceptible to cuts and tears and water penetration allowing for possible damage to the freight. Likewise, it is very easy for thieves to cut the canvas cover in order to remove the freight from the vehicle. Canvas covers also have a relatively short life due to tree limbs, ice, vandals and low overhangs damaging the canvas. It is therefore desirable to provide a different and better means for covering the open top end of a truck or trailer vehicle.

A partial solution to the above problems is to mount a rigid cover to the truck. Such a cover is disclosed in U.S. Pat. No. 3,180,674 issued to C. C. Pounds. The Pounds cover is designed for permanent installation on a pick-up truck and as such is not easily adaptable to long flat-bed trucks such as semi-trailers. Another type of permanent installation for a pick-up truck is disclosed in U.S. Pat. No. 3,489,456 issued to R. A. Klanke. A slightly different version wherein the cover is slidably mounted to the pick-up truck is disclosed in the U.S. Pat. No. 3,765,967 issued to William J. Ahrens. In a related industry, covers for gondola cars are disclosed in U.S. Pat. No. 2,674,208 issued to W. M. Keller et al. A cover assembly having a plurality of panels telescopically connected together for mounting to the rear portion of a truck is disclosed in the U.S. Pat. No. 3,342,523 issued to C. J. Lutgen.

Disclosed herein is a new and improved panel assembly for enclosing the open top end of a trailer vehicle. The panels are relatively heavy and large requiring removal of the covers of the panels from the trailer vehicle by a crane preventing ready removal of the panels by thieves. The panels are secured to the trailer with metal hinges and cables decreasing the possibility of accidental disengagement of the panels relative to the trailer during transit of the trailer. Theh panels are produced from fiber glass and will have a longer life as compared to tarpaulin or canvas covers. The panels disclosed herein may be produced from fiber glass eliminating the maintenance normally required with canvas covers. The fiber glass panels are relatively more expensive initially as compared to canvas covers; however, by eliminating the maintenance expenses the subject panels will be considerably less expensive over a period of time.

A practical disadvantage relative to canvas coverings is the amount of time required to remove or install the covering on the trailer. When a canvas covered trailer is empty, often the trailer is not covered due to the difficulty involved. The canvas cover typically is thrown in the trailer on the floor or dropped in a storage area open to the rain and snow. The floor of the trailer will then become damaged from the elements since the trailer is not covered by the canvas cover. The cover disclosed herein must be removed by a crane and likewise must be replaced with a crane. Thus, after the trailer is unloaded the cover is placed back on the trailer in order to free the crane for use in other areas. Since the subject cover is composed of a plurality of individual panels, not all the panels must be removed for loading and unloading. The trailer may only be partially unloaded without requiring complete removal of the cover.

SUMMARY OF THE INVENTION

One embodiment of the present invention is a panel for mounting atop opposite vertical walls of a trailer vehicle to provide an enclosure on the vehicle comprising a main body of rigid fiber glass including a top wall integrally joined to opposite depending sidewalls and opposite depending first and second end walls, a pair of side channels fixedly mounted interiorly to and between the opposite sidewalls forming a seat for the panel to sit atop the vertical walls, an end channel fixedly mounted to the first end wall and extending between the opposite sidewalls and being positioned between the side channels and the top wall, the end channel having one leg secured to the first end wall and a second leg disposed outwardly of the first end wall forming a guideway to receive a vertical end wall of an adjacent panel, and means at least partially mounted exteriorly to the opposite sidewalls operable to enable the main body to be lifted by the means and also operable to secure the main body to the sidewalls of the trailer vehicle.

Another embodiment of the present invention is a trailer vehicle including a bed with wheels rotatably mounted to and depending therefrom, the vehicle including upwardly extending opposite sidewalls mounted to the bed defining a peripherally extending edge portion, a first rigid panel mounted atop the edge portion and extending across the bed between the sidewalls, a second rigid panel mounted atop the edge portion being laterally adjacent the first panel and extending across the bed between the sidewalls of the vehicle, the first panel and the second panel being removably interlocked together, means securing the first panel and the second panel together.

It is an object of the present invention to provide a new and improved means for covering the open top end of a truck or trailer vehicle.

A further object of the present invention is to provide panels for mounting to the open top end of a truck or trailer vehicle with the panels having means for interlocking together.

In addition, an object of the present invention is to provide a rigid panel assembly for enclosing the open top end of a truck or trailer vehicle with means provided for lifting of the panel assembly and for securing the panel assembly to the vehicle.

Related objects and advantages of the present invention will be apparent from the following description.

DESCRIPTION OF THE PREFERRED EMBODIMENT

Figure 1:
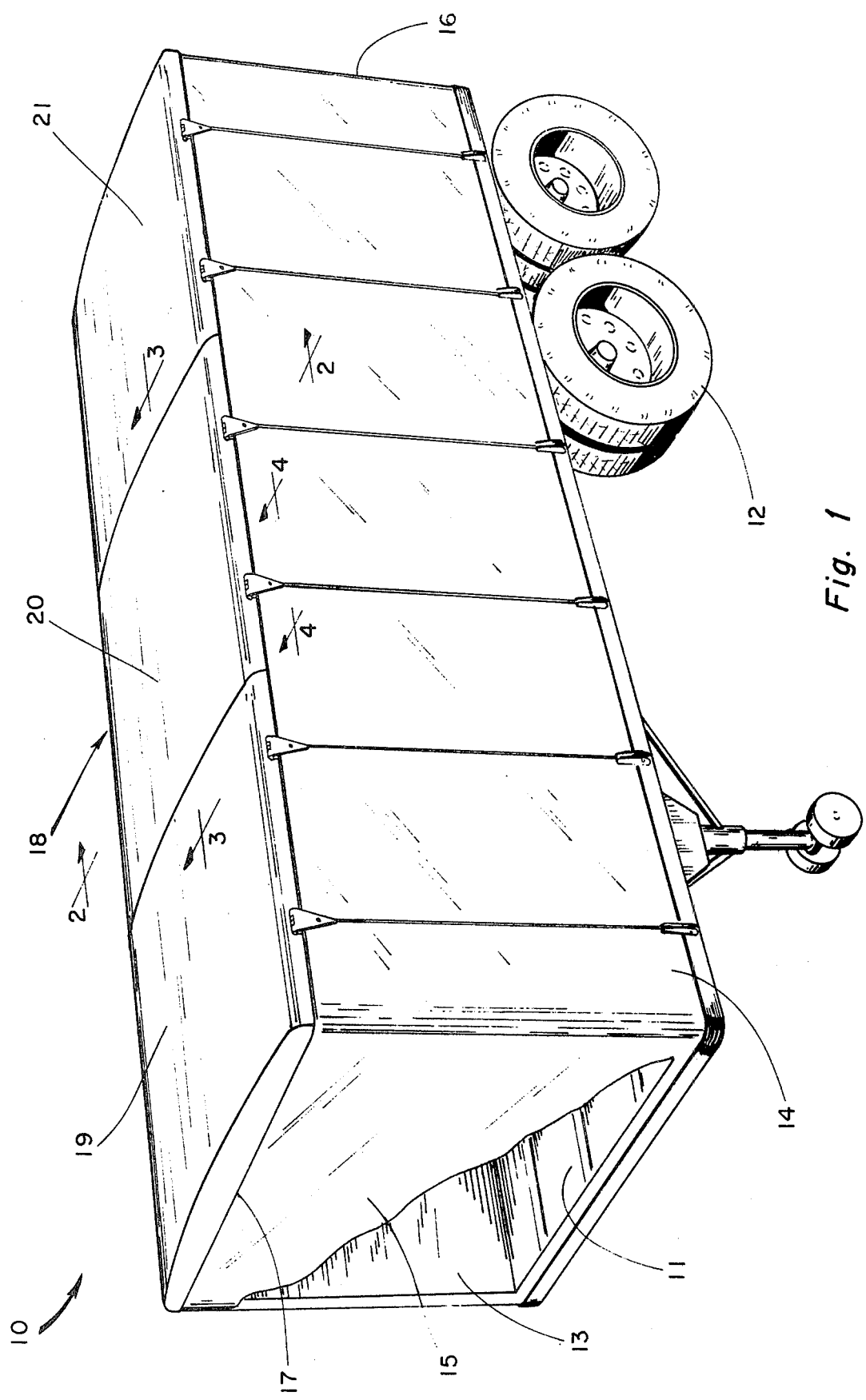
FIG. 1 is a fragmentary perspective view of a trailer vehicle incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a trailer vehicle 10 including a conventional bed 11 with wheels 12 rotatably mounted to the bed and depending therefrom. The vehicle includes a pair of upwardly extending opposite sidewalls 13 and 14 along with a pair of upwardly extending opposite end walls 15 and 16 mounted to bed 11. The sidewalls and end walls define a peripherally extending edge portion 17 forming an open top end which may be enclosed by cover assembly 18. Cover assembly 18 includes a plurality of rigid panels 19, 20 and 21 interconnected together.

Panel 20 will now be described it being understood that a similar description applies to panels 19 and 21. Panel 20 includes a main body (FIG. 2) of rigid fiber glass having a top wall 22 integrally joined to opposite depending sidewalls 23 and 24. In addition, a pair of opposite depending end walls 25 and 26 (FIG. 3) are integrally joined to walls 22 through 24.

A pair of right angle side panels 27 and 28 (FIG. 2) are fixedly mounted to the interior surfaces of sidewalls 23 and 24 and extend the length of panel 20. Each right angle bracket is attached to panel 20 by means of conventional fasteners such as rivets 29. Channels 27 and 28 form seats 30 and 31 which are restable atop the top edge of sidewalls 13 and 14 of the trailer vehicle.

An upwardly opening U-shaped channel 32 (FIG. 3) is fixedly mounted to end wall 25 and extends across from sidewall 23 to sidewall 24 of the panel. One vertical leg of channel 32 is mounted interiorly to end wall 25 whereas the remaining vertical wall 33 is disposed outwardly of end wall 25 forming a guideway 34 to receive the vertical end wall 35 of the adjacent panel 19. The vertical walls of channel 32 are integrally joined together by a horizontal wall 36 which rests atop the horizontal wall of brackets 27 and 28. Channel 32 extends between brackets 27 and 28 and top wall 22.

A downwardly opening U-shaped channel 36' is mounted to the opposite end wall 26 of panel 20. Channel 36' has a pair of vertical legs 26' and 38 integrally joined together by a horizontal wall 39 forming a groove 40 for receipt of wall 33 of the U-shaped panel fixedly attached to panel 21. Wall 38 is fixedly attached to the interior surface of wall 26. In addition, a flange 41 integrally attached to wall 26' is fixedly attached to the horizontal wall of brackets 27 and 28. Channel 36' extends between the opposite side walls 23 and 24 of panel 20 and is positioned between top wall 22 and channels 27 and 28. Channel 36 not only provides a groove for receipt of a vertical leg of an upwardly opening U-shaped channel but also provides a wall 38 for strengthening and reinforcing wall 26 of panel 20. Channel 32 extends completely across panel 20 forming a rain gutter to receive rain from walls 25 and 35 directing the rain water outwardly of the side walls of the vehicle.

Figure 2:
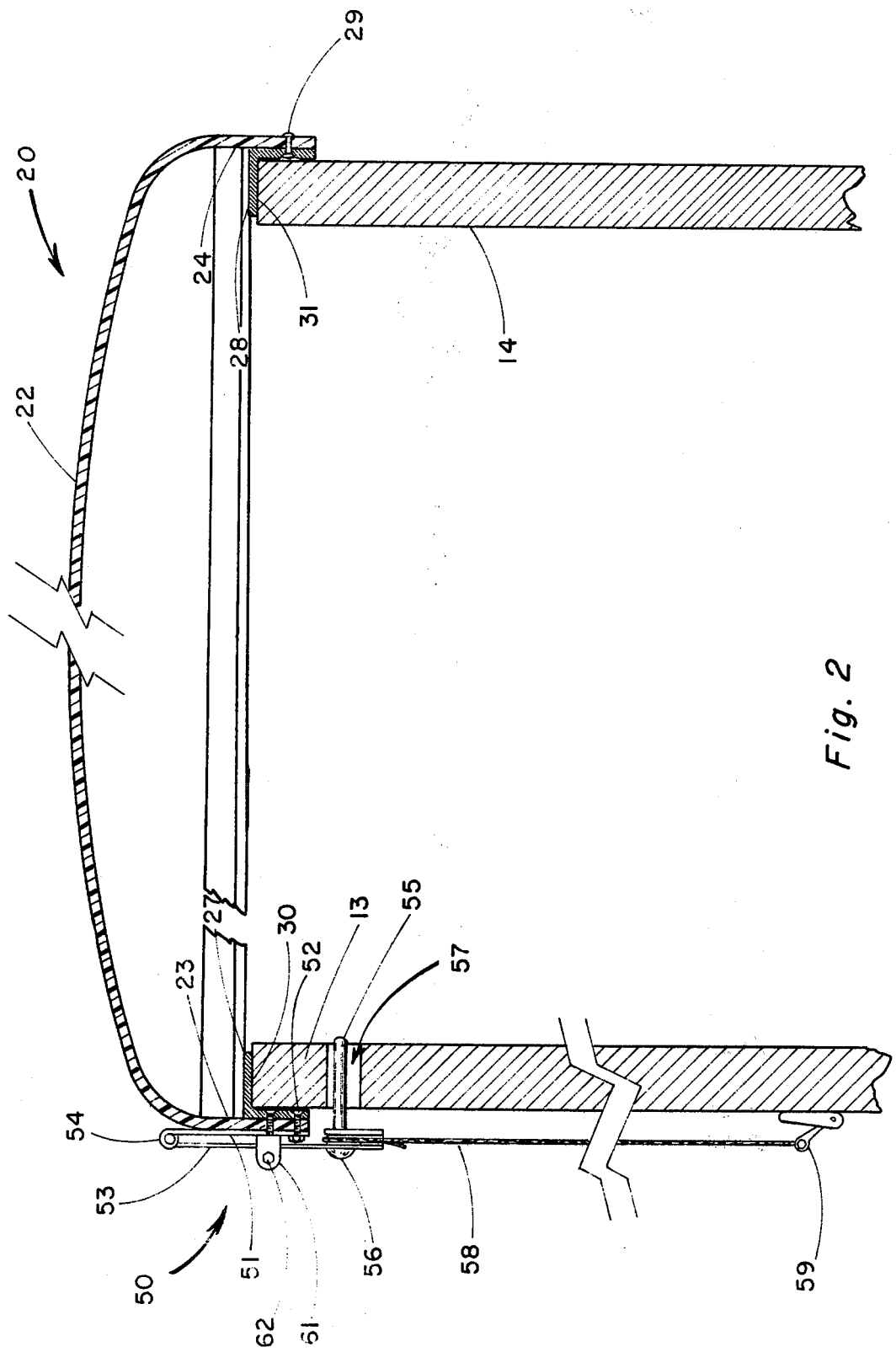
FIG. 2 is an enlarged fragmentary cross sectional view taken along the line 2—2 of FIG. 1 and viewed in the direction of the arrows.
Figure 3:
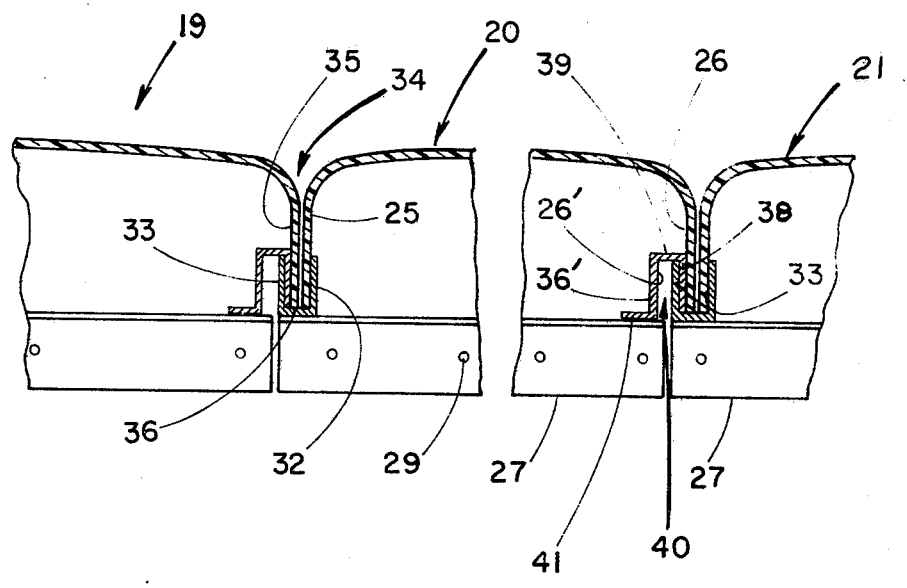
FIG. 3 is an enlarged fragmentary cross sectional view taken along the line 3—3 of FIG. 1 and viewed in the direction of the arrows.
Figure 4:
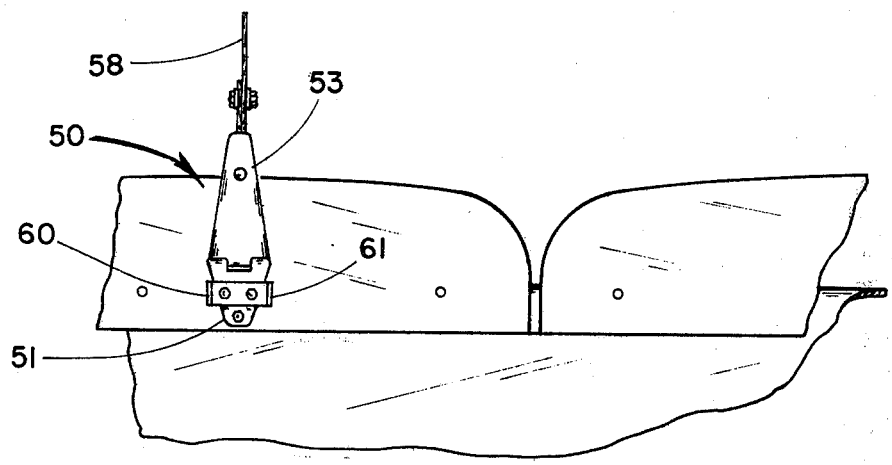
FIG. 4 is an enlarged fragmentary side view looking in the direction of arrows 4—4 of FIG. 1 with the mounting brackets shown in the upward position.

A plurality of brackets are mounted exteriorly to the opposite sidewalls of the panels to enable the panels to be lifted off of the trailer vehicle and also to allow the securing of the panels to the side walls of the trailer vehicle. Brackets 50 each have a vertical wall 51 (FIG. 2) fixedly mounted to either sidewall 23 or sidewall 24 of a panel. Conventional fastening devices 52 (FIG. 2) secure the bracket walls 51 to the panel walls 23 and 24. A second wall 53 is pivotally mounted by hinge 54 to wall 51 and may be pivoted from a downward position as shown in FIG. 2 to an extended position as shown in FIG. 4. A plurality of pins are mounted to walls 53 of the brackets. For example, pin 55 extends through wall 53 (FIG. 2) with the head 56 of the pin being secured to wall 53 by means such as by welding. Passages 57 are provided in walls 13 and 14 to allow pins 55 to project therethrough preventing relative motion of the panels with respect to the vehicle.

A plurality of wire cables are mounted to the pins to enable the panels to be secured to the vehicle and to also provide a means for lifting the panels from the vehicle. For example, cable 58 is fixedly attached to pin 55 and is shown in FIG. 2 as having a bottom end connected to sidewall 13 by means such as a chain binder 59. Likewise, by untying the bottom end of cable 58 the bracket may be swung to the upward position as shown in FIG. 4 allowing cable 58 to be used for the lifting of the panel from the truck.

A pair of opposed walls 60 and 61 are fixedly secured to wall 51 (FIG. 4) and project outwardly therefrom. Each wall 60 and 61 is provided with an aperture through which a fastening device 62 (FIG. 2) projects. By pivoting wall 53 to the downward position as shown in FIG. 2, and by then installing fastener 52 through wall 60 and 61, outward movement of wall 53 is prevented.

A variety of materials may be used to produce the panels; however, excellent results have been obtained by producing the panels from fiber glass. A metal frame may be mounted beneath wall 22 of the panel in order to provide additional rigidity to the top wall.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A panel for mounting atop opposite vertical walls of a trailer vehicle to provide an enclosure on said vehicle comprising:

a main body of rigid fiber glass including a top wall integrally joined to opposite depending sidewalls and opposite depending first and second end walls;

a pair of side channels fixedly mounted interiorly to and between said opposite sidewalls forming a seat for said panel to sit atop said vertical walls;

an end channel fixedly mounted to said first end wall and extending between said opposite sidewalls and being positioned between said side channels and said top wall, said end channel having one leg secured to said first end wall and a second leg disposed outwardly of first end wall forming a guideway to receive a vertical end wall of an adjacent panel;

means at least partially mounted exteriorly to said opposite sidewalls operable to enable said main body to be lifted by said means and also operable to secure said main body to said sidewalls of said trailer vehicle;

a downwardly opening channel positioned between said opposite side channels and said top wall, said downwardly opening channel having opposite depending vertical legs integrally joined together by a horizontal wall, said downwardly opening channel having an outwardly extending flange integrally attached to one depending vertical leg and to said pair of side channels with the remaining depending vertical leg fixedly attached to and reinforcing said second vertical end wall of said main body.

2. The panel of claim 1 wherein:

said opposite side channels are right angle brackets with vertical walls attached to said opposite sidewalls of said main body, said right angle brackets have horizontal walls with lower surfaces forming said seat.

3. The panel of claim 2 wherein:

said end channel opens upwardly and is positioned atop and extends over and across said horizontal walls of said opposite side channels forming a rain gutter directing rain from said first end wall of said main body outwardly of said sidewalls of said vehicle.

4. The panel of claim 3 in combination with and interconnected to an adjacent identical panel.

5. A panel for mounting atop opposite vertical walls of a trailer vehicle to provide an enclosure on said vehicle comprising:

a main body of rigid fiber glass including a top wall integrally joined to opposite depending sidewalls and opposite depending first and second end walls;

a pair of side channels fixedly mounted interiorly to and between said opposite sidewalls forming a seat for said panel to sit atop said vertical walls;

an end channel fixedly mounted to said first end wall and extending between said opposite side walls and being positioned between said side channels and said top wall, said end channel having one leg secured to said first end wall and a second leg disposed outwardly of first end wall forming a guideway to receive a vertical end wall of an adjacent panel;

means at least partially mounted exteriorly to said opposite sidewalls operable to enable said main body to be lifted by said means and also operable to secure said main body to said sidewalls of said trailer vehicle; and wherein:

said means includes a bracket hingedly mounted to said main body and a cable fixedly attached to an end of said bracket allowing said main body to be lifted by said cable when said bracket is swung upwardly and allowing tying of said cable to said vehicle when said bracket is swung downwardly; said means further includes a pin fixedly secured to said bracket with said pin extendable into said sidewall of said vehicle when said bracket is swung downwardly to limit movement of said panel relative to said vehicle.

6. A panel for mounting atop opposite vertical walls of a trailer vehicle to provide an enclosure on said vehicle comprising:

a main body of rigid fiber glass including a top wall integrally joined to opposite depending sidewalls and opposite depending first and second end walls;

a pair of side channels fixedly mounted interiorly to and between said opposite sidewalls forming a seat for said panel to sit atop said vertical walls;

an end channel fixedly mounted to said first end wall and extending between said opposite sidewalls and being positioned between said side channels and said top wall, said end channel having one leg secured to said first end wall and a second leg disposed outwardly of said first end wall forming a guideway to receive a vertical end wall of an adjacent panel;

means at least partially mounted exteriorly to said opposite sidewalls operable to enable said main body to be lifted by said means and also operable to secure said main body to said sidewalls of said trailer vehicle; and wherein:

said means includes a bracket hingedly mounted to said main body and a cable fixedly attached to an end of said bracket allowing said main body to be lifted by said cable when said bracket is swung upwardly and allowing tying of said cable to said vehicle when said bracket is swung downwardly, and, said means further includes a hinge wall fixedly mounted to said main body and hingedly connected to said bracket, said means further includes mutually opposed flanges fixedly mounted to said hinge wall with a removable fastener extending between said flanges so that when said bracket is swung downwardly and said removable fastener is extended between said flanges, and said bracket extends between said fastener and said hinge wall limiting upward movement of said bracket.

7. The combination of:

a trailer vehicle including a bed with wheels rotatably mounted to and depending therefrom, said vehicle including upwardly extending opposite sidewalls mounted to said bed defining a peripherally extending edge portion;

a first rigid panel mounted atop said edge portion and extending across said bed between said sidewalls;

a second rigid panel mounted atop said edge portion being laterally adjacent said first panel and extending across said bed between said sidewalls of said vehicle, said first panel and said second panel being removably interlocked together;

first means securing said first panel and said second panel together; and wherein:

each panel includes a main body of rigid fiber glass having a top wall integrally joined to opposite depending sidewalls and opposite first and second depending end walls, each main body having a pair of side channels fixedly mounted interiorly to and between said opposite sidewalls of said main body forming a seat for said panel to sit atop said opposite sidewalls of said vehicle, said first means including an upwardly opening U-shaped channel extending between said opposite sidewalls of said main body of said first and second panels said U-shaped channel having one vertical leg and a second vertical leg spaced apart forming a guideway to receive a vertical end wall of each main body of said first and second panels and thus removably interlocking the first and second panels, each main body including second means mounted thereto operable to enable said main body to be lifted by said second means and also operable to secure said main body to said sidewalls of said vehicle;

said second means includes a bracket hingedly mounted to said main body and a cable fixedly attached to an end of said bracket allowing said main body to be lifted by said cable when said bracket is swung upwardly and allowing tying of said cable to said vehicle when said bracket is swung downwardly;

said second means further includes a pin fixedly secured to said bracket with said pin extendable into said sidewall of said vehicle when said bracket is swung downwardly to limit movement of said panel relative to said vehicle.

8. The combination of:

a trailer vehicle including a bed with wheels rotatably mounted to and depending therefrom, said vehicle including upwardly extending opposite sidewalls mounted to said bed defining a peripherally extending edge portion;

a first rigid panel mounted atop said edge portion and extending across said bed between said sidewalls;

a second rigid panel mounted atop said edge portion being laterally adjacent said first panel and extending across said bed between said sidewalls of said vehicle, said first panel and said second panel being removably interlocked together;

first means securing said first panel and said second panel together; and wherein:

each panel includes a main body of rigid fiber glass having a top wall integrally joined to opposite depending sidewalls and opposite first and second depending end walls, each main body having a pair of side channels fixedly mounted interiorly to and between said opposite sidewalls of said main body forming a seat for said panel to sit atop said opposite sidewalls of said vehicle, said first means including an upwardly opening U-shaped channel extending between said opposite sidewalls of said main body of said first and second panels, said U-shaped channel having one vertical leg and a second vertical leg spaced apart forming a guideway to receive a vertical end wall of each main body of said first and second panels and thus removably interlocking the first and second panels, each main body including second means mounted thereto operable to enable said main body to be lifted by said second means and also operable to secure said main body to said sidewalls of said vehicle;

said second means includes a bracket hingedly mounted to said main body and a cable fixedly attached to an end of said bracket allowing said main body to be lifted by said cable when said bracket is swung upwardly and allowing tying of said cable to said vehicle when said bracket is swung downwardly;

said second means further includes a hinge wall fixedly mounted to said main body and hingedly connected to said bracket, said second means further includes mutually opposed flanges fixedly mounted to said hinge wall with a removable fastener extending between said flanges so that when said bracket is swung downwardly and said removable fastener is extended between said flanges, and said bracket extends between said fastener and said hinge wall limiting upward movement of said bracket.

* * * * *